United States Patent [19]

Coran et al.

[11] E Re. 30,030

[45] Reissued Jun. 12, 1979

[54] INTEGRAL PNEUMATIC TIRE AND WHEEL COMPRISING A WHEEL PORTION WITH AXIALLY SPACED MEMBERS

[75] Inventors: Aubert Y. Coran; Arthur J. Lambright, both of Akron, Ohio

[73] Assignee: Monsanto Company, St. Louis, Mo.

[21] Appl. No.: 893,885

[22] Filed: Apr. 6, 1978

Related U.S. Patent Documents

Reissue of:

[64] Patent No.: 3,977,454
Issued: Aug. 31, 1976
Appl. No.: 485,808
Filed: Jul. 5, 1974

[51] Int. Cl.[2] ..... B60C 7/00
[52] U.S. Cl. ..... 152/323; 301/63 PW
[58] Field of Search ..... 152/323-330; 301/63 PW

[56] References Cited

U.S. PATENT DOCUMENTS

| | | | |
|---|---|---|---|
| 2,766,802 | 10/1956 | Grobowski | 301/63 PW |
| 3,023,192 | 2/1962 | Shivers | 418/73 |
| 3,048,447 | 8/1962 | Klint | 152/323 X |
| 3,062,254 | 11/1962 | Keefe | 123/39 |
| 3,188,775 | 6/1965 | Cosmos | 152/323 X |
| 3,208,500 | 9/1965 | Knipp et al. | 152/327 |
| 3,362,451 | 1/1968 | Mettugh | 152/360 |
| 3,470,933 | 10/1969 | Molnar | 152/330 |
| 3,503,432 | 3/1970 | Maiocchi | 152/361 |
| 3,651,014 | 3/1972 | Witsiepe | 528/301 |
| 3,666,322 | 5/1972 | Ackron | 301/63 PW |
| 3,695,728 | 10/1972 | Haussels | 301/63 PW |
| 3,697,364 | 10/1972 | Boustary et al. | 428/266 |
| 3,701,374 | 10/1972 | McGillvray | 526/329 |
| 3,709,845 | 1/1973 | Boustary et al. | 260/17.4 BB |
| 3,763,109 | 10/1973 | Witsiepe | 528/301 |
| 3,766,146 | 10/1973 | Witsiepe | 528/301 |

FOREIGN PATENT DOCUMENTS

| | | |
|---|---|---|
| 885675 | 12/1961 | United Kingdom. |
| 1033377 | 6/1966 | United Kingdom. |

*Primary Examiner*—Joseph F. Peters, Jr.
*Assistant Examiner*—Norman L. Stack, Jr.
*Attorney, Agent, or Firm*—Larry R. Swaney

[57] ABSTRACT

An integral pneumatic tire and wheel is described, comprising a tire portion having an enclosed chamber and a wheel portion having axially spaced support members.

17 Claims, 9 Drawing Figures

INTEGRAL PNEUMATIC TIRE AND WHEEL COMPRISING A WHEEL PORTION WITH AXIALLY SPACED MEMBERS

Matter enclosed in heavy brackets [ ] appears in the original patent but forms no part of this reissue specification; matter printed in italics indicates the additions made by reissue.

This invention relates generally to vehicle tires and wheels and more particularly to an integral pneumatic tire and wheel formed by molding. A related application is applicants' co-pending application of even date, Ser. No. 485,807, filed July 5, 1974.

BACKGROUND OF THE INVENTION

The construction of pneumatic rubber tires by conventional methods, comprising the assembly of components such as carcass plies, beads and tread, led to an undesirable number of sub-standard tires because of misalignment of parts and because of non-uniformities such as splices. Conventional fabrication methods are also costly because of the many manual operations involved. Consequently, the manufacture of hollow tires and hollow wheels from synthetic resins or thermoplastic polymers by stationary or rotational molding techniques have been developed, British Pat. No. 1,033,377, by U.S. Pat. No. 3,208,500 and U.S. Pat. No. 3,470,933. Hollow tires manufactured by molding synthetic resins or thermoplastic polymers reduce both the occurrence of non-uniformities and the number of manual steps but said tires must be mounted on a separate rim and consequently have the attendant slipping and balancing problems associated with tire-rim assemblies. Hollow wheels manufactured by molding synthetic resins or thermoplastic polymers, in addition to reducing non-uniformities and manual operations, eliminate the need for a rim; however, because of the expansive sidefaces, they cannot withstand substantial pneumatic pressure without ballooning and are limited in their load-bearing capacity.

An integral tire and wheel formed as a unit by molding techniques is also known. For example, Keefe, U.S. Pat. No. 3,062,254, describes a molded tire and wheel in which the wheel is internally supported by a radial web. An integral tire and wheel comprising a tire body reinforced by textiles and a wheel having an integral peripheral rim in which the wheel and rim are stiffened by a resin material which material may be further reinforced by fiber, preferably fabric, is disclosed by McHugh, U.S. Pat. No. 3,362,451. However, the disclosure suggests that the integral tire and wheel of the patent having no additional support in the wheel portion may exhibit excessive lateral deflections during use since the preferred construction provides for reinforcing the walls of the wheel portion by a pair of annular metallic plates, col. 4, lines 10–24. In both patents, the body portion is disposed essentially within the plane of the circumferential centerline of the integral tire and wheel. Also in both patents, assembly of the integral tire and wheel requires placing separate parts in the mold (in one case, a web and in the other case, a fabric ply) which placements afford opportunity for misalignments to occur.

This invention provides an integral pneumatic tire and wheel which integral tire and wheel may be formed by molding techniques from moldable material which may be the same material in both the tire portion and wheel portion. The integral tire and wheel of the invention possesses several advantages. One advantage, because it has no metal rim, is its light weight which leads to fuel savings. Another advantage due to its improved uniformity is that it requires no balancing which improvement in part is due to the absence of separate components which may misalign and because the tire and wheel may be molded entirely from homogeneous material. Still another advantage is that the construction of the integral tire and wheel requires fewer operations resulting in reduced cost. Also, the wheel portion is free of separate supporting means yet exhibits adequate lateral stability. Moreover, when the tire and wheel is made from select materials, it is capable of high speed operation with loads typical for motor vehicles. These and other advantages will become apparent as the description of the invention proceeds.

SUMMARY OF THE INVENTION

This invention provides an integral tire and wheel which comprises a tire portion comprising an enclosed chamber and a wheel portion comprising axially spaced support members. The integral tire and wheel is composed entirely of moldable material which permits producing the whole unit by molding techniques. The tire portion comprises a body whose inner surface is generated by a plane closed figure rotated about a line in its plane that does not intersect the figure which surface defines an enclosed chamber. The enclosed chamber is inflatable but it need not be inflated since the enclosed chamber containing air at essentially atmospheric pressure imparts significant pneumatic character to the tire. The enclosed chamber may be adapted with an inflating means to permit pressurized pneumatic operation. In high performance applications, filling the enclosed chamber with a liquid or inflating with compressed gas is recommended. However, the invention includes integral tire and wheels in which the chamber of the tire is essentially enclosed but contains a small opening to the outside permitting semi-pneumatic operation. This feature is of particular advantage in the event of a puncture.

The wheel portion comprises a hub and a plurality of support members connecting the hub and the tire portion. The hub may be a single cylinder or concentric cylinders or rings. At least one of the support members is spaced axially from the midplane. The term midplane as used herein and in the claims means the plane of the circumferential centerline of the tire portion. When more than one support member is displaced from the midplane, preferably they are displaced on opposite sides of the midplane which support members may be parallel to the midplane or disposed at an angle in respect to the midplane. The support members are substantially circular plates which may be flat, conical or corrugated. In one embodiment of the invention, the support members comprise a pair of discs, each being parallel but on opposite sides of the midplane. In another embodiment of the invention, the support members comprise a pair of conical plates opposing each other on opposite sides of the midplane. The support members may contain lightening holes, if desired. When there is a number of lightening holes, and particularly when the holes are elongated in the direction of the rolling radius, the support members become a plurality of spokes extending radially from the hub to the tire portion. The spokes may be directly opposite one another or they may be alternatively staggered around the circumference of the wheel portion. The placement of support members on opposite sides of the midplane imparts substantial rigidity and enhances the lateral stability of the wheel portion.

The support members may contain one or more ribs for added rigidity. The ribs may extend radially from the hub to the tire portion or may comprise a circle concentric with the rolling axis or may be serpentine or combinations thereof. When radial ribs are used, it is preferred to use four or more equally spaced ribs per support member. Of course, any known rib configuration is applicable. Ribs as used herein are extensions of support members and should not be confused with support members since a rib comprises only a portion of a support member which may exist with or without ribs, whereas, ribs do not exist alone but only as a part of a support member. Thus, an element designated a rib herein when existing alone becomes a support member.

Features of the invention are further described in the accompanying drawings and description thereof.

DETAILED DESCRIPTION OF THE DRAWINGS

Figure 1:
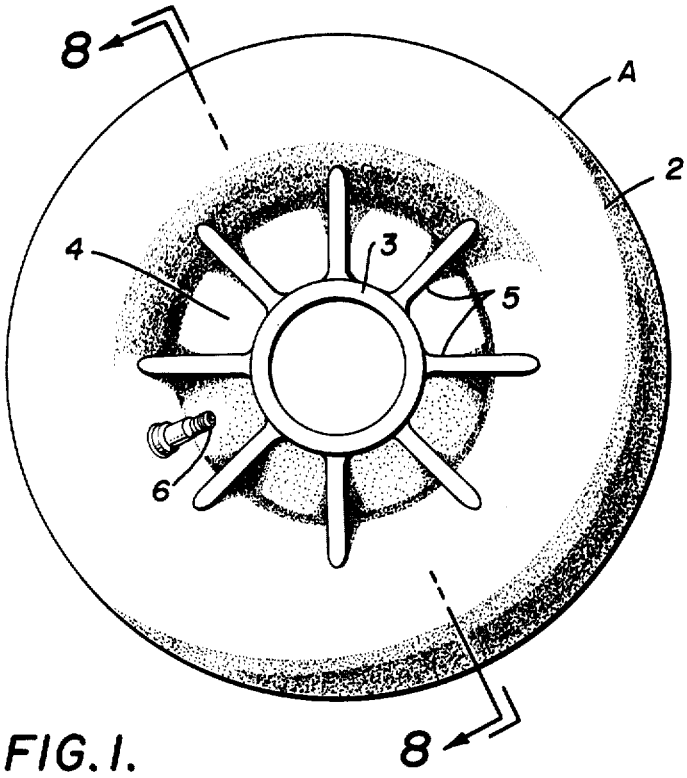
FIG. 1 is a sideview of integral tire and wheel A of the invention.

Referring to the drawings, FIG. 1 shows an integral tire and wheel of the invention, the complete unit being generally designated by the letter A. Integral tire and wheel A comprises tire portion 2 and wheel portion (undesignated) comprising hub 3, support member 4 and a plurality of ribs, two of which are identified by number 5. Also shown is inflating means 6.

Figure 2:
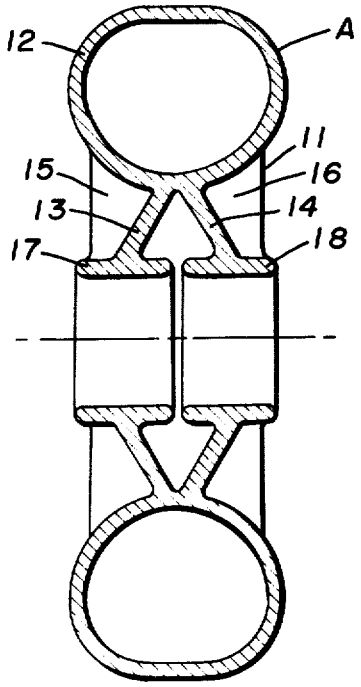
FIG. 2 is a sectional view taken on line 8—8 of FIG. 1.

FIG. 2, a sectional view of integral tire and wheel A, shows tire portion 12 comprising an enclosed chamber and wheel portion 11. Wheel portion 11 comprises axially spaced conical support members 13 and 14 comprising opposing ribs 15 and 16 and hub members 17 and 18. Of course, it is understood that ribs are optional, however, they are preferred since they substantially stiffen the wheel portion which permits thinner support members 13 and 14 which results in both material savings and weight reduction. The radius of conical support members 13 and 14 increases toward the midplane forming in the section a triangular space in which each support member is one side of the triangle and the hub is the base. Support members 13 and 14 meet at tire portion 12 forming the apex of the triangle. This arrangement of conical support members 13 and 14 provides greater rigidity to wheel portion 11 and illustrates a preferred embodiment of the invention. Hub members 17 and 18 comprises two concentric cylinders which may fit directly to the axle or a cylindrical sleeve may be inserted between the hub members and the axle which sleeve may also contain a bearing assembly.

Figure 3:
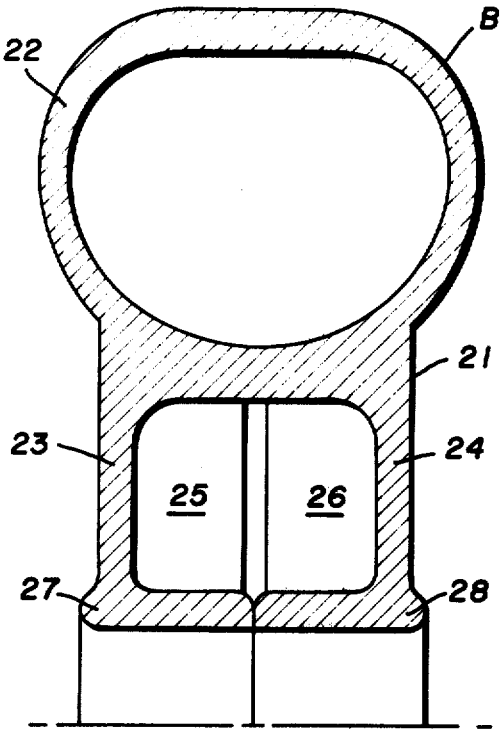
FIG. 3 is a sectional view of integral tire and wheel B of the invention having internal ribs in the wheel portion.

A section of integral tire and wheel B having a wheel portion with internal ribs is illustrated in FIG. 3. Integral tire and wheel B comprises wheel portion 21 and tire portion 22 comprising an inflatable enclosed chamber. Wheel portion 21 comprises hub members 27 and 28 and support members 23 and 24 essentially parallel to the midplane of B. A pair of internal ribs 25 and 26 are situated in the space between support members 23 and 24. Of course, a plurality of such pairs radiate through the wheel portion 21. Ribs 25 and 26 may or may not be opposite one another. Placing the ribs internally in the wheel portion gives an integral tire and wheel which is more easily cleaned and which has greater aesthetic appeal.

Figure 4:
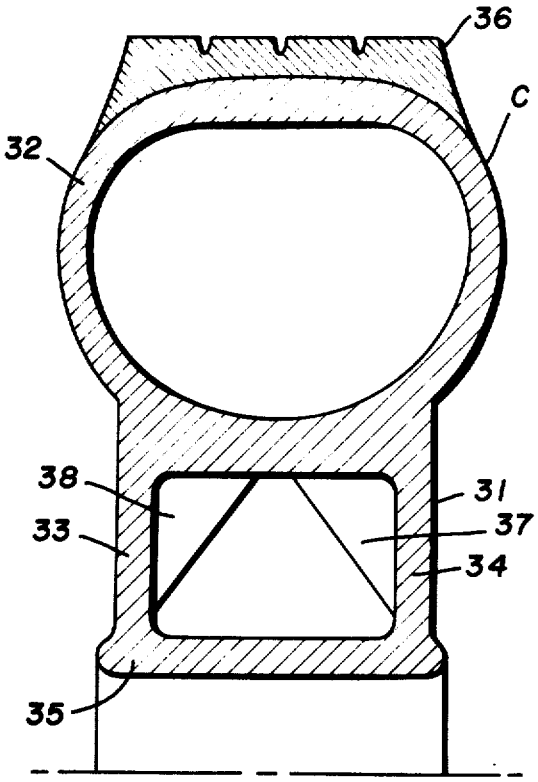
FIG. 4 is a sectional view of integral tire and wheel C of the invention having a tread and triangular internal ribs.

Integral tire and wheel C with tread is shown in FIG. 4. Support members 33 and 34 of wheel portion 31 connect tire portion 32 with hub 35 comprising a single cylinder. Triangular radial ribs 37 and 38 provide additional rigidity to support members 33 and 34. Tread 36 is provided in the crown area of tire portion 32 which tread 36 may optionally contain one or more circumferential belts. Tread 36 may be an integral part of tire portion 32 being shaped and formed at the same time that integral tire and wheel C is molded. Alternately, integral tire and wheel C may be molded separately and tread 36 attached, or a green rubber tread stock and an integral tire and wheel may be placed in a curing mold with a bond between the rubber tread and the tire portion being formed while curing the rubber tread.

Figure 5:
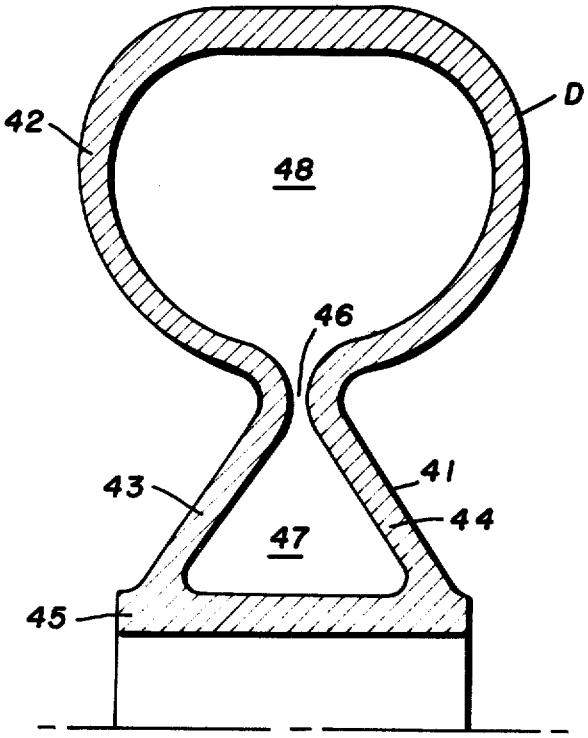
FIG. 5 is a sectional view of partially completed integral tire and wheel D of the invention formed by rotational molding.

FIG. 5 illustrates a section of an incomplete integral tire and wheel D formed by rotational molding. The integral tire and wheel D is incomplete as shown because chamber 48 of tire portion 42 connects via channel 46 to chamber 47 bounded by hub 45 and by support members 43 and 44 of wheel portion 41. Integral tire and wheel D is completed by sealing channel 46, thereby isolating chamber 48 from chamber 47. The closing of channel 46 by joining support members 43 and 44 imparts substantial rigidity to wheel portion 41. It is important that channel 46 is sufficiently sealed to prevent leakage of pneumatic fluid from the enclosed chamber of tire portion 42 into chamber 47.

Several suitable means are available for joining support members 43 and 44 at channel 46 to effect isolation of chambers 47 and 48. For example, a viscous thermosetting resin may be injected through a needle into chamber 47 and the resin allowed to set while rotating the heated unit. Alternately, an epoxy adhesive or urethane may be injected and permitted to set while rotating the unit. It is understood that in any of these methods, the rate of rotation must be controlled, depending upon the tackiness and viscosity of the injected resin, to assure that channel 46 is filled. Generally, a few simple experiments are adequate to determine the proper rate of rotation for any particular bonding agent. When the walls of integral tire and wheel D comprises fusible thermoplastic materials, channel 46 may be closed by heating, such as induction heating, support members 43 and 44 in the vicinity of channel 46 followed by application of opposing external mechanical pressure.

Figure 6:
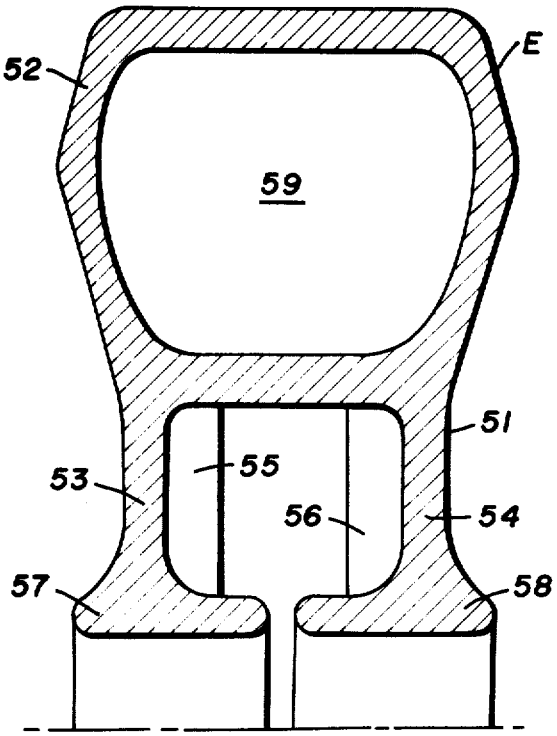
FIG. 6 is a sectional view of integral tire and wheel E of the invention in which the shape of the section of the tire portion is quasi-rectangular.

A section of integral tire and wheel E in which the shape of the section of the tire portion is quasi-rectangular is illustrated in FIG. 6. Integral tire and wheel E comprises wheel portion 51 and tire portion 52 comprising an inflatable enclosed chamber 59. Wheel portion 51 comprises hub members 57 and 58 and support members 53 and 54. A pair of internal reinforcing ribs 55 and 56 comprise part of support members 53 and 54, respectively. It is understood that the invention is not limited by the shape of a section of the tire portion but that other shapes may be used. For example, the shape of a section of the tire portion may approximate a circle, rectangle, triangle, trapezium or trapezoid.

Figure 7:
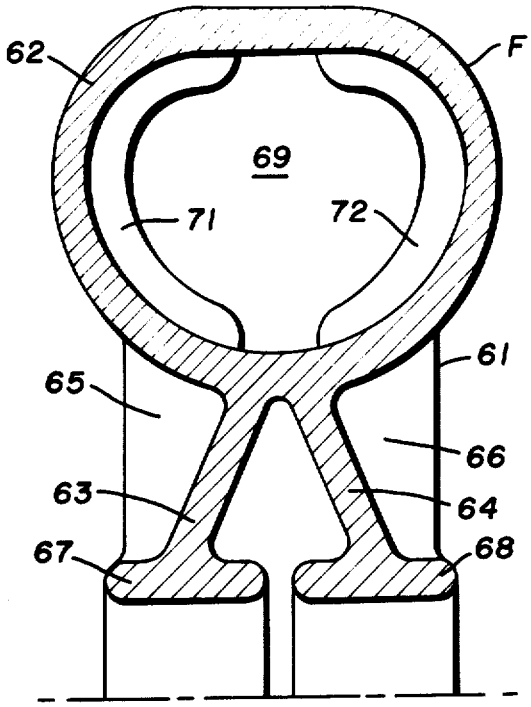
FIG. 7 is a sectional view of integral tire and wheel F of the invention having ribs within the enclosed chamber of the tire portion.

Integral tire and wheel F having ribs within the tire portion is shown in FIG. 7. Integral tire and wheel F comprises tire portion 62 and wheel portion 61. Tire portion 62 contains a plurality of ribs, the depth of which may be constant or varied, a pair of such ribs 71 and 72 are shown, within enclosed chamber 69. Wheel portion 61 comprises hub members 67 and 68 and axially spaced support members 63 and 64 having external ribs 65 and 66, respectively.

Figure 8:
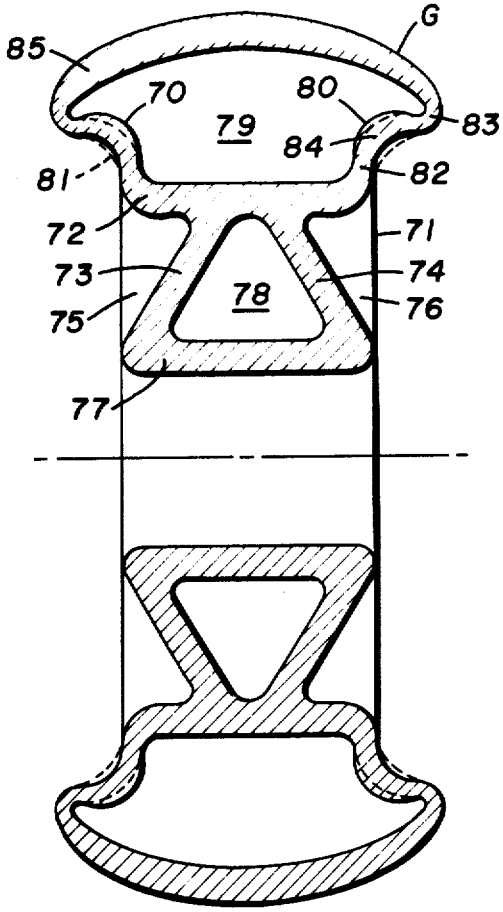
FIG. 8 is a sectional view of integral tire and wheel in which the tire portion has sidewalls which when under service conditions are under compression.

Integral tire and wheel G having sidewalls which are under compression under service conditions is illustrated in FIG. 8. Integral tire and wheel G comprises tire portion 72 containing enclosed chamber 79 and wheel portion 71 containing enclosed chamber 78. Wheel portion 71 comprises hub 77 and conical support members 73 and 74 with radial ribs 75 and 76, respectively. Tire portion 72 comprises a crown portion 85 being wider than any other part of the tire portion and sidewalls 70 and 80. An undesignated base which is shared (being an integral part of) with wheel portion 71 completes tire portion 72. Sidewall 80 illustrative of both sidewalls comprises central zone 84 which is thicker than adjacent zones 82 and 83. Phantom line 81 indicates the position of sidewall 70 when the tire is inflated. An advantage of a tire portion with the design as illustrated in FIG. 8 is that under service conditions, the sidewalls are under compressive stress. The shape of central zone 84 may be varied considerably and still be satisfactory for the purpose of this invention. Examples of suitable shapes of zone 84 are illustrated by FIGS. 3 to 7 of U.S. Pat. No. 3,805,868, the disclosure of which is incorporated herein by reference.

Figure 9:
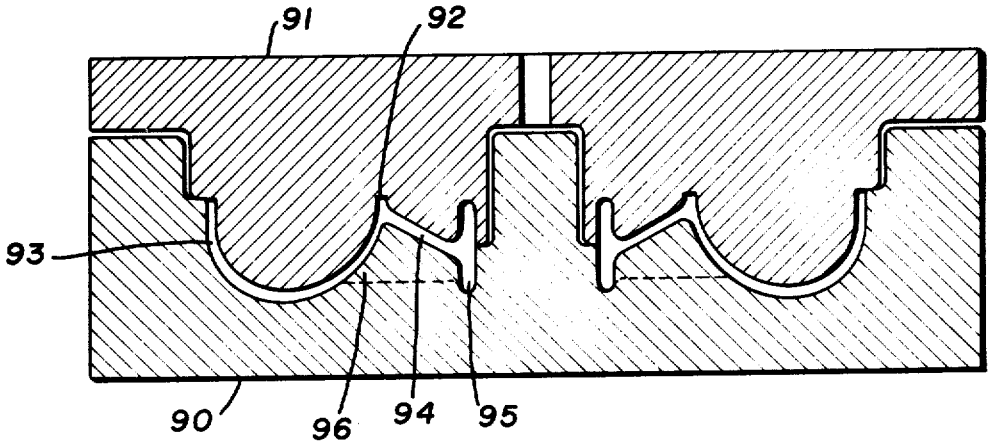
FIG. 9 is a sectional view of a mold suitable for preparing one-half tire and wheel portions.

FIG. 9 shows a sectional view of a mold for preparing one-half tire and wheel portions. The mold comprises female member 90 and male member 91 which when closed delineates cavity 92 having a contour of a one-half tire and wheel portion. Cavity 92 comprises space 93 which defines substantially a one-half tire portion and an undesignated space which defines substantially a one-half wheel portion. The one-half wheel portion comprises support member 94 and hub 95. Rib 96 is indicated by phantom lines.

An integral tire and wheel of the invention may be prepared by conventional techniques, such as injection, compression or rotational molding. For example, two one-half tire and wheel portions divided along the midplane are molded separately and the two halves joined to form an integral tire and wheel of the invention. A mold satisfactory for preparing an integral tire and wheel of the invention comprises a mold member having a shape corresponding to the inner contour of the one-half tire and wheel portions and a female member having a shape corresponding to the outer contour of the one-half tire and wheel portions. Two one-half tire and wheel portions are joined while centered on a common axis to form an integral tire and wheel. Two similarly shaped or identical one-half tire and wheel portions can be joined to form an integral tire and wheel, however, an integral tire and wheel may be formed by joining matching surfaces of unequal parts of tire and wheel portions.

In assembling integral tire and wheel A of FIG. 2, two one-half tire and wheel portions are joined at the center of the crown of tire portion 12 and essentially at the midplane midway between support members 13 and 14. In assembling integral tire and wheel C of FIG. 4, two one-half tire and wheel portions are joined at three interfaces. One interface is located at the crown of tire portion 32, another interface is located in hub 35, and the third interface is located in the undesignated portion shared by the tire and wheel portions.

The one-half tire and wheel portions may be joined by any conventional bonding method, preferably by a method giving a bond having a strength of the same order as the material from which the tire and wheel is composed. For example, one-half tire and wheel portions may be joined by conventional adhesives, the selection of the adhesive depending upon the material used in constructing the tire and wheel. Epoxy-based adhesives, isocyanate-based adhesives, urethane-based adhesives and phenolic-resin-based adhesives or mixtures thereof are examples of satisfactory adhesives. It is understood that within the context of this invention, although there may be bonded interfaces, once bonds are formed, the complete assembly is an integral tire and wheel.

When parts of the tire and wheel portions are composed of fusible thermoplastic polymer, the parts may be joined by heating the interfaces sufficiently to fuse the polymer, pressing the parts together and allowing them to cool under pressure, thereby forming an integral unit. When joining parts by fusion, upon cooling, the interfaces essentially disappear. The fusion technique for joining integral tire and wheel parts is preferred because it eliminates adhesives and also because it assures that the physical properties of the integral tire and wheel are essentially uniform.

When the tire and wheel portions are molded by rotational molding, as illustrated in FIG. 5, closing of channel 46 is required to isolate the enclosed chamber of the tire portion from the enclosed chamber of the wheel portion. The channel may be closed while performing the molding operation by careful control of the amount of material charged to the mold, of the temperature and of the rates of rotation, or closing of the channel may be achieved by application of opposing mechanical pressure.

Any moldable material capable of conforming to the shape of the cavity of a mold is suitable for preparing an integral tire and wheel of the invention. The selection of suitable moldable material depends upon the application in which the integral tire and wheel is to be used, i.e., the properties required of a material used in assembly of an integral tire and wheel for use on a toy are substantially different from the properties of a material used in assembly of an integral tire and wheel for use in low speed-high load applications. Still different properties of the material are required where the integral tire and wheel will be subjected to severe dynamic forces, such as on motor vehicles.

Both thermosetting, including vulcanizable materials, and thermoplastic materials are applicable. Essentially any known moldable material satisfactory for forming tires is suitable for use in making an integral tire and wheel of this invention. A preferred class of moldable materials is elastic materials which forcibly retract to their approximate original shape after mechanically imposed deformations. Of course, the selection of any particular elastic material is made at least in part so that the degree of mechanical deformation encountered in normal use essentially does not exceed the elastic limit of the material. Another preferred class of moldable materials is extrudable materials which may be forced by pressure through an orifice. Thermoplastic polymers which are both extrudable and elastic comprise a more preferred class of moldable materials.

The properties of the moldable material after molding and, curing when necessary, is a matter of choice which generally depends upon the application in which the integral tire and wheel is to be used. Examples of suitable materials are those which exhibit tensile strengths of 70 Kg./sq.cm. or more, ultimate elongations up to 800% or more and Young's modulus of 200–20,000 Kg./sq.cm. For many applications, satisfactory moldable materials are those which exhibit tensile strengths of about 100–500 Kg./sq.cm., ultimate elongations of 20% or more and Young's modulus of about 300–7000 Kg./sq.cm. Preferred moldable materials, especially for high performance applications, are thermoplastic polymeric materials which exhibit ultimate elongations of 30% or more, Young's modulus of about 400–2200 Kg./sq.cm. and tensile strength of about 140–500 Kg./sq.cm. In addition, for high performance applications, materials exhibiting low hysteresis under tire operating conditions should be selected. Materials with hysteresis (tangent of phase angle) of about 0.06 or less are particularly useful with hysteresis of below about 0.04 being preferred. More preferred moldable materials exhibit a Young's modulus of about 800–1250 Kg./sq.cm., ultimate elongations of 50% or more and tensile strength of about 200–500 Kg./sq.cm. at room temperature. Especially preferred are thermoplastic polymeric materials exhibiting tensile strength of at least 100 Kg./sq.cm. at 100° C.

The mechanical properties of moldable materials are measured by ASTM Test Method D638-72 using test specimens according to ASTM D1708-66 except the specimens are pulled at a speed of one inch per minute up to 30% elongation then at a speed of ten inches per minute until failure.

Examples of satisfactory moldable materials are vulcanizable rubber compositions, synthetic resins and polymers; such as polyvinyl chloride, polyethylene, polypropylene, acrylonitrile-butadiene-styrene polymers (ABS), ethylene vinyl acetate polymers, polyamides and urethane polymers produced by the reaction of diisocyanates and diols, diisocyanates and polyalkylene ether glycols, diisocyanates and polyesters, and diisocyanates and polyether-esters. Elastic thermoplastic polyesters derived from polyalkylene ether glycols and aromatic dicarboxylic acids, or copolyether-esters derived from polyalkylene ether glycols, short-chain diols and aromatic dicarboxylic acids are especially useful. Copolyether-esters derived from polyalkylene ether glycols, short-chain diols and terephthalic acid; and related polymers in which a minor portion of the terephthalic acid segments of the polymer is replaced with aliphatic dicarboxylic acid segments are preferred. Examples of moldable materials suitable for the purpose of this invention are described in Shivers, U.S. Pat. No. 3,023,192, Knipp, U.S. Pat. No. 3,208,500, Molnar, U.S. Pat. No. 3,470,933, Witsiepe, U.S. Pat. No. 3,651,014, McGillvray, U.S. Pat. No. 3,701,374, Witsiepe, U.S. Pat. No. 3,763,109 and Witsiepe, U.S. Pat. No. 3,766,146, the disclosures of which are incorporated herein by reference.

The moldable materials may contain conventional compounding ingredients such as reinforcing pigments, antidegradants, plasticizers, cure agents, extenders and may also contain discontinuous organic or inorganic fibers such as nylon, polyester, cellulose, rayon, cotton, glass or metal. Discontinuous fibers reinforce matrices in which they are dispersed; and they may be oriented to give integral tire and wheels having different properties according to the direction of orientation. Composite materials with ultimate elongation of about 9% or more are satisfactory. Suitable moldable composite materials comprising discontinuous cellulose fibers dispersed in vulcanizable compositions are described in Boustany et al, U.S. Pat. Nos. 3,697,364 and 3,709,845, the disclosures of which are incorporated herein by reference.

Two different moldable materials may be placed at different locations within the mold, if desired, for example, a more flexible material may be placed in the tire portion of the mold and a stiffer material may be placed in the wheel portion giving an integral tire and wheel having different physical characteristics in the two portions. Of course, when using two different moldable materials, it is necessary to select two materials which will mold with interfacial integrity. The two materials must knit together or unite as a result of being processed in intimate contact with one another in the mold.

DESCRIPTION OF PREFERRED EMBODIMENTS

One-half tire and wheel portions are molded in a steel compression mold as shown in FIG. 9 comprising top and bottom members which form a cavity having the shape of one-half of an integral tire and wheel divided along the midplane. The top and bottom members of the mold are provided with cooling means, heating means and temperature sensing means. A typical molding procedure is as follows: After applying a release agent to surfaces of the mold cavity, the mold is preheated to the desired curing temperature of curable materials or to about 20° C. above the melting temperature of the thermoplastic materials to be molded. The mold is charged with a measured quantity of moldable material in liquid, sheet, pellet or powder form and the mold is closed under pressure. In the case of curable materials, the mold is heated for the desired cure time, the mold opened and the molded part removed. In the case of thermoplastic polymers, the mold is heated for sufficient time to melt the polymer. After the polymer melts and flows, the heat is turned off, the cooling means turned on, and the mold pressure is increased incrementally as the mold cools. When the temperature of the polymer falls below the recrystallization or hardening temperature, the mold is opened and the molded part removed.

Parts are molded from thermoplastic polymer by the above procedure by charging weighed quantities of copolyether-ester polymer comprising butylene terephthalate segments and polyalkylene ether glycol segments which polymer is sold by the du Pont Company as Hytrel® Polyester Elastomer. Integral tire and wheels, for example, as illustrated in FIGS. 1 and 2, are prepared by welding two parts together. The welding procedure is as follows: The molded parts are rotated on a common axis while the surfaces to be joined are heated with hot gases. Heating is continued until the surfaces are molten after which the halves are pressed together until the molten polymer flows, fuses and recrystallizes permanently joining the two halves. Flashing at joints may be removed, if desired.

An integral tire and wheel having a diameter of 25.4 centimeters assembled as described is adapted with a conventional valve, inflated with about 2.1 Kg./sq.cm. pressure, and run on a 1.71 meter diameter test wheel at about 38° C. ambient temperature under a load of about 157 kilograms. The integral tire and wheel is run sequentially; 15 minutes at 64 kilometers/hour, 15 minutes at 96 kilometers/hour, 15 minutes at 112 kilometers/hour, 15 minutes at 129 kilometers/hour, 15 minutes at 145 kilometers/hour and 3 minutes at 161 kilometers/hour at which time a melt fracture occurs in the shoulder region of the tire portion. A similar tire and wheel but having a rubber tread bound to the crown runs through a similar test sequence fails after ½ minute at 145 kilometers/hour. Another tire and wheel having a rubber tread runs on an outdoor 0.76 meter diameter test wheel at 48 kilometers/hour under a load of 82 Kg. for 200 hours without failure.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. An integral tire and wheel unit, composed entirely of a homogeneous moldable elastic material, comprising [a] *an inflatable* tire portion, a wheel portion and a hub, said tire portion comprising a substantially enclosed chamber, said wheel portion comprising a plurality of support members connecting the hub and tire portion, said tire and wheel portions being integrally molded to provide interfacial integrity therebetween each portion being homogeneous throughout and in which at least one of said support members is spaced axially from the midplane *and contains one or more ribs connecting both the tire and wheel portions* to impart substantial rigidity and lateral stability to the wheel portion.

2. The tire and wheel of claim 1 in which the tire portion is provided with an inflating means.

3. The tire and wheel of claim 1 in which the tire portion is semi-pneumatic.

4. The tire and wheel of claim 1 in which a pair of support members are spaced on opposite sides of the midplane *and contain ribs extending from the hub to the tire portion.*

5. The tire and wheel of claim 4 in which the support members are conical plates.

6. The tire and wheel of claim 5 in which the support members are reinforced with *radial* ribs.

7. The tire and wheel of claim 6 having four or more equally spaced radial ribs per support member.

8. The tire and wheel of claim 4 in which the support members are flat circular plates.

9. The tire and wheel of claim 1 in which the tire portion has ribs protruding from the sidewalls into the enclosed chamber.

10. The tire and wheel of claim 1 in which the moldable material in the final product is thermoplastic polymeric material which has a Young's modulus of about 200 to 20,000 Kg./sq.cm.

11. The tire and wheel of claim 10 in which the polymeric material has a Young's modulus of about 400 to 2200 Kg./sq.cm.

12. The tire and wheel of claim 11 in which the polymeric material has a tensile strength at 100° C. of at least 100 Kg./sq.cm.

13. The tire and wheel of claim 12 composed of copolyether-ester elastomer derived from polyalkylene ether glycols, short-chain diols and aromatic dicarboxylic acids.

14. The tire and wheel of claim 4 in which the support members are parallel.

15. The tire and wheel of claim 4 in which the hub is a pair of cylinders.

16. The tire and wheel of claim 1 having a rubber tread.

17. The tire and wheel of claim 1 having a tire portion with a crown wider than any other part of the tire portion and sidewalls which have a central zone thicker than adjacent zones which sidewalls under service conditions are under compressive stress.

* * * * *